(12) United States Patent
Jing et al.

(10) Patent No.: US 7,386,131 B2
(45) Date of Patent: Jun. 10, 2008

(54) TOLERANT DIGITAL CERTIFICATE DISTRIBUTE SYSTEM AND DISTRIBUTE METHOD

(75) Inventors: Jiwu Jing, Beijing (CN); Dengguo Feng, Beijing (CN)

(73) Assignee: Graduate School of Chinese Academy of Sciences (CN)

( * ) Notice: Subject to any disclaimer, the term of this patent is extended or adjusted under 35 U.S.C. 154(b) by 686 days.

(21) Appl. No.: 10/702,177

(22) Filed: Nov. 5, 2003

(65) Prior Publication Data

US 2004/0103276 A1 May 27, 2004

Related U.S. Application Data

(63) Continuation of application No. PCT/CN02/00684, filed on Sep. 27, 2002.

(30) Foreign Application Priority Data

Sep. 28, 2001 (CN) .................. 01136018

(51) Int. Cl.
*H04L 9/00* (2006.01)
*H04K 1/04* (2006.01)
*H04K 1/06* (2006.01)

(52) U.S. Cl. ............... 380/278; 713/156; 713/176; 713/170; 380/279; 380/47; 380/28; 380/37

(58) Field of Classification Search ........... 380/278, 380/279, 47, 28, 37; 713/156, 176, 170
See application file for complete search history.

(56) References Cited

U.S. PATENT DOCUMENTS 5,675,649 A * 10/1997 Brennan et al. ............ 380/286

(Continued)

FOREIGN PATENT DOCUMENTS

WO  WO 9957847  11/1999

(Continued)

OTHER PUBLICATIONS

Victor Shoup; Practical Threshold Signatures; May 2000; Eurocrypt 2000; LNCS 1807; pp. 207-220.*

(Continued)

*Primary Examiner*—Matthew Heneghan
*Assistant Examiner*—James Turchen (57) ABSTRACT

A digital certificate issuing system with intrusion tolerance ability and the issuing method thereof are disclosed. The system comprises an offline secret key distributor, at least one online task distributor, k online secret share calculators and m online secret share combiners. And the method includes: splitting a private key into multiple first sub-secret-keys and multiple second sub-secret-keys, wherein the multiple first sub-secret-keys are divided into k groups, and the private key is constructed by one second sub-secret-key and t first sub-secret-keys, the second sub-secret-key corresponds to the t first sub-secret-keys according to an equation combination representation including t items of j and i, j is sequence number of the group which has the first sub-secret-key, and i is number of the first sub-secret-key in the jth group, each of j in one equation combination representation is different, j, i, k, and t are positive integers, and t is less than k; calculating t first calculation results according to a certificate to be signed and the t first sub-secret-keys in the multiple first sub-secret-keys upon receiving the certificate to be signed; obtaining the second sub-secret-key corresponding to the t first sub-secret-keys according to the equation combination representation; calculating a second calculation result according to the second sub-secret-key obtained and the certificate to be signed; generating a digital signature according to the t first calculation results and the second calculation result; generating a digital certificate according to the digital signature and contents of the certificate to be signed.

22 Claims, 3 Drawing Sheets

U.S. PATENT DOCUMENTS

| | | | |
|---|---|---|---|
| 5,708,714 A * | 1/1998 | Lopez et al. | 713/180 |
| 6,035,041 A * | 3/2000 | Frankel et al. | 380/30 |
| 6,209,091 B1 * | 3/2001 | Sudia et al. | 713/175 |
| 6,237,096 B1 | 5/2001 | Bisbee et al. | |
| 6,237,097 B1 * | 5/2001 | Frankel et al. | 713/180 |
| 6,477,254 B1 * | 11/2002 | Miyazaki et al. | 380/286 |
| 6,810,122 B1 * | 10/2004 | Miyazaki et al. | 380/30 |
| 6,959,394 B1 * | 10/2005 | Brickell et al. | 726/5 |
| 7,003,677 B1 * | 2/2006 | Herzberg et al. | 713/180 |
| 7,088,822 B2 * | 8/2006 | Asano | 380/45 |
| 2001/0002485 A1 | 5/2001 | Bisbee et al. | |
| 2002/0076052 A1 * | 6/2002 | Yung et al. | 380/277 |

FOREIGN PATENT DOCUMENTS

| | | |
|---|---|---|
| WO | WO 0141360 | 6/2001 |
| WO | WO 0143344 | 6/2001 |

OTHER PUBLICATIONS

Joy Algesheimer, Jan Camenisch, and Victor Shoup; Efficient Computation Modulo a Shared Secret with Application to the Generation of Shared Safe-Prime Products; Aug. 18-22, 2002 Crypt 2002; LNCS 2442; pp. 417-432.*

Yongdae Kim, Adrian Perrig, and Gene Tsudik; Simple and Fault-Tolerant Key Agreement for Dynamic Collaborative Groups; Nov. 2000; ACM; Proceedings of the 7th ACM conference on computer and communications security; pp. 235-244.*

Ji-wu Jing and Deng-guo Feng; An Intrusion-Tolerant CA Scheme; Aug. 2002; Journal of Software; vol. 13, No. 8; pp. 1417-1422.*

* cited by examiner

--Prior Art--

TOLERANT DIGITAL CERTIFICATE DISTRIBUTE SYSTEM AND DISTRIBUTE METHOD

CROSS-REFERENCE TO RELATED APPLICATIONS

This application is a continuation of PCT/CN02/00684 filed Sep. 27, 2002. This application claims the benefit of Chinese Patent Application No. 01136018.6 filed Sep. 28, 2001. The disclosures of the above applications are incorporated herein by reference.

FIELD OF THE INVENTION

The present invention relates to network communication security technology, more specifically to a digital certificate issuing system with intrusion tolerance ability and issuing method thereof which can ensure the safety of digital signatures.

BACKGROUND OF THE INVENTION

Digital signature nowadays is a basic technology in the field of network communication security. Digital signature uses Asymmetric Cryptography Algorithm to assure that others may verify the digital signature but cannot personate it. The most popular asymmetric algorithms are RSA, DSA and Elliptical Curve Algorithm etc. At present, many digital signature systems are based on RSA (Ron Rivest, Adi Shamir and Len Adleman Algorithm) algorithm.

The asymmetric algorithm is that the reverse computation parameter cannot be derived from the known computation parameters, i.e. while the computation procedure is known, yet it has no computation ability to do reverse computation. The asymmetric algorithm is publicized, everyone can select his own parameters, and different parameters will result in different constituted transformation functions. One may select a group of parameters, some of them used for reverse computation are called secret parameters, technically called secret key or private key; the others used for computation are called public parameters or public key.

Implementation of the digital signature is based on the asymmetric algorithm. On the one hand, the self-possessed secret parameter-private key is protected, which will assure that no one can forge the digital signature; on the other hand, by publicizing what could be put to publicity—the public key, verification of the signature could be carried out for certain people. In fact, deriving secret parameters from public parameters are computationally infeasible theoretically.

First of all, digital signature guarantees the security of network communication and interaction, and it ensures that the counterpart of the communication is authentic and that it is yourself that is on line; at the same time digital signature can be used as a tool for signing electronic documents in order to protect the self-possessed documents and signatures. Today, in many countries, digital signature has already been considered the same as manual signature, and both of them have the same legal effect.

Digital signature algorithms can also be used for negotiation of secret parameters. Suppose user A needs to communicate with user B secretly, then, user A defines secret parameters and encrypts them with user B's public key. By this means, only user B can decrypt the encrypted secret parameters, since only user B knows his own private key.

Besides, digital signature can also be used in cases where confidentiality authentication or non-repudiation is required.

The Public Key Infrastructure (PKI) that has been popular worldwide is a kind of application for digital signature. PKI is a vital infrastructure for a digital society as the importance of the electricity infrastructure for the industrial society.

To ensure security and speed of digital signatures, before signing, the content to be signed has to be hashed using a message digest function to get a hashed value, sometimes called digest value, M, and then the signature value will be obtained by encrypting the digest value with the private key. When verifying a signature, first a hash computation is made and then the public key decrypts the signature value; then the obtained result is compared with the above hashed result, if they are equal to each other, the signature is correct, otherwise the verification cannot be passed.

Nevertheless, suppose that user A has a private key and a public key, and there is an attacker B who regenerates a private key and a public key and replaces user A's public key with his own public key (the attacker B's public key). In this case, encrypted messages sent to user A by his friend will only be decrypted by attacker B, for user A does not know the corresponding private key of the forged public key of attacker B. At this time, it is highly demanded to have a Certificate Authority (CA) to verify which public key belongs to user A or to prove which public key does not belong to user A.

CA has a longer private key than that of the common users, i.e. the CA private key is more secure, and the CA public key is well-known by various ways publicly. Thus, every user can verify which is signed and issued by CA. When user's identity is attached with the user's public key and signed by CA, the user gets a digital certificate, which proves the identity of the legitimate owner of the public key. Further more, everyone can verify a digital certificate, but no one can forge a digital certificate.

At present, the digital certificate is the most pivotal part of PKI, while CA is the key unit in PKI. With the help of the digital certificate, security of a network, such as confidentiality, integrity, non-repudiation etc, can be solved effectively.

Security based on PKI eventually will be focused on the security of the CA's private key. Once the CA's private key is compromised, all certificates issued by the CA must be revoked and the network security controlled by the CA will be compromised. Along with the increasing of various means of network attacks, system vulnerabilities constantly be discovered, so it becomes a crucial topic of modern network security researches to insure security of online digital signature service.

For RSA, secret-key usually is noted as d that can be an integer as long as 2048 bits. Generally speaking, a private key with 1024 bits in length is enough to assure security, but for CA's, with the length of 2048 bits or even longer is recommended. The RSA uses the computation of modular exponentiation of a number N i.e. calculating expression $M^d$ mod N, the computation is necessary for a digital signature. When the public key is publicized, protecting the integer d is to protect the private key.

The purposes of a secure digital signature is to fulfill signing but without compromising the private key. According to this subject, many theoretical researches have been carried out in the world, while some of the theories and methods are too difficult to implement due to the complexity. On the other hand, present development of PKI is focused on producing compatible digital signature products, but little development has made on aspect of secure signature with intrusion tolerance ability. So-called intrusion tolerance is relative to the intrusion detection to guarantee CA security; that is, even when part of a system has been attacked or occupied, secret information of the CA system will not be compromised.

In summary, PKI is based on public key algorithm, and CA is a trusted center of a domain in a PKI system. Communication and authentication between devices or individuals on a network depends on a digital certificate signed and issued by a CA. A digital certificate is data obtained by attaching a public key to the personal identity and then signed with the private key of a CA. When one side of a communicator wants to verify the identity of the other side, there are two steps: first, verifying whether the signature of the certificate of the other side is correct or not, for the signature can only be produced by the CA private key; and then verifying whether the other side has the private key corresponding to the public key in the certificate. If these two steps are performed successfully, then the identity of the other side is determined and trustworthy.

Therefore, the CA private key is the core part of CA security. So to protect it from compromising is the foundation of the security of the entire CA domain. In general, CA has to be an online network device, especially the one that gets direct connection with users to provide corresponding certificate services, thus it is unavoidable to be attacked. When a hacker attacked a CA successfully, he might acquire internal resource of the CA, consequently the CA private key, and this would cause fatal damage to the PKI system. Meanwhile as a precaution, it should be assured that employee working for PKI who has got entire control of some components of a CA system cannot get the CA private key either.

In the following paragraphs, suppose that a digital signature is equivalent to implementing expression $M^d \bmod N$, wherein d is a private key, and several existing methods for security digital signature are described.

Figure 1:
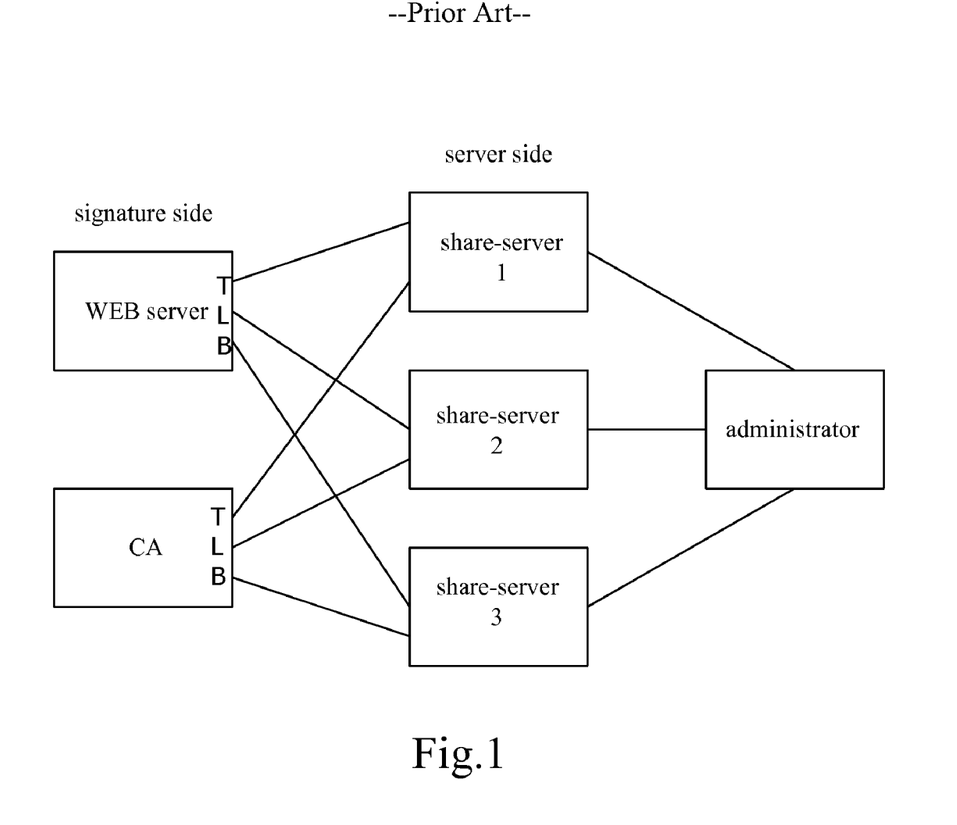
FIG. 1 is a schematic diagram illustrating a CA system prototype of ITTC project at US Stanford University.

Reference to FIG. 1, this is a prototype system diagram of ITTC project at US Stanford University. The system implements intrusion tolerance through threshold cryptography technology. There are clients, servers and an administrator in the system. The Web Server of the clients refers to the web server that requests signatures and CA is the certificate authority. The servers include multiple share-servers, called as share calculators or share operators, which are responsible for producing the secure digital signatures, as the share-server 1 to share-server 3 in FIG. 1. The administrator is an optional device used to manage the share servers. Features of the scheme are simple configuration and high security, in this system a single layer structure with multiple share-servers is used.

Principle for the system to achieve security is to first divide a private key d into a sum of t numbers: $d=d_1+d_2+ \ldots +d_t$, and then each number $d_i$ is allocated to every share-server accordingly. When a signature is necessary, the client, a web or a CA, sends the information of a HASH value M that needs to be signed to every share-server; and then every share-server returns the computation result $Mi=M^{d_i}$ to the client, a web or a CA, accordingly. The client then makes multiplication:

$$S = \prod_{i=1}^{t} M^{d_i} = M^{\sum_{i=1}^{t} d_i} = M^d$$

And the result needed is obtained.

To implement redundancy, multiple groups of the equations can be further used to implement redundancy configuration, i.e. taking several groups of the d division randomly, such as:

First group: $d=d_{11}+d_{12}+ \ldots +d_{1t}$;
Second group: $d=d_{21}+d_{22}+ \ldots +d_{2t}$;

Then, the numbers of multiple groups $(d_{ij})$ are allocated to different share-servers in the way that every share-server can obtain multiple $d_{ij}$, but can only obtain one data of the same group, for example share-server 1 obtains $d_{11}$ from the first group and $d_{23}$ from the second group. For instance, suppose there are four share-servers and t=3, the allocation can be as in the following table:

| Share-server 1 | Share-server 2 | Share-server 3 | Share-server 4 |
|---|---|---|---|
| $d_{11}$ | $d_{12}$ | $d_{13}$ | $d_{13}$ |
| $d_{23}$ | $d_{21}$ | $d_{22}$ | $d_{23}$ |

When a client, a Web or a CA, wants to compute the signature, the client selects t perfect share-servers and tells the share-servers which group of the data or parameters should be used, and then the share-servers can compute the according signature.

Advantages of this scheme are obvious, but the disadvantages are as follows.

1. It is difficult to allocate and manage sub-secret-keys. Whenever adding a share-server, the sub-secret-keys must be allocated for every online share-server and also the adding of the new share-server must be known by clients.
2. When there are many share-servers, the storage capacity for sub-secret-keys will be rapidly increased. Suppose the total number of share-servers is k, and the required number of the perfect share-servers is t, then the number of stored sub-secret-keys for each share-server is at least $C_k^{t-1}$, wherein C represents combination. When k=10 and t=3, each share-server has to store 45 sub-secret-keys.
3. There is a synchronization problem that must be solved at first. Before computation, the client must select t share-servers, then find out data groups matching to the t share-servers and inform them; once one of the t share-servers has been destroyed, the above selecting procedure must be repeated.
4. It is difficult for the client (CA or Web server) to remember every change made by the share-servers, it is not easy to manage or extent, especially when the client is online, it is more difficult to extend so that updating the data of client is necessary whenever the share-servers' parameters change.

Victor Shoup at IBM Research Zurich Institute has released an article titled "Practical Threshold Signatures" on Europe Cryptography Annual Meeting in the Year 2000, what the article introduces is a theoretical scheme on digital signature. The scheme employs RSA algorithm with strong prime, primes kept in secret are p=2p'+1 and q=2q'+1. All interpolation equations are made in the ring of mod m=p'q'. Since $M^{4m}$ mod N is equal to 1, when computation is separate, one more square operation is needed. This is performed by the Combiner that takes a square operation to each result respectively, to obtain $M^{4(gm+d)}$, wherein $\Delta=(k!)^2$ and g is an integer. In this scheme, CA is performed by the combiner, so the synchronization problem before computation is eliminated, but it increases computation difficulties and decreases computation performance of the combiner. For example, the combiner must compute following formula:

$$W = y_{i_1}^{2\lambda c_{i_1}} y_{i_2}^{2\lambda c_{i_2}} \ldots y_{i_t}^{2\lambda c_{i_t}}$$

wherein $y_i$ is the computation result of each share-server and $\lambda = k!$.

It can be seen that the features and disadvantages of this scheme lie in:

1. It is still a single layer sharing structure consisted of share-servers, the combiner does not store any secret information, so any device can fulfill the combination work.
2. Computation volume of the combiner is approximate to or equal to that of signing for t times, this computation volume is far more than that of the share-servers, so even if the algorithm can be implemented, the scheme cannot be used in practical signing.
3. It is required to use strong primes, which will bring about limitation for some applications.
4. It is only described theoretically that other devices will not be affected when increasing or deleting a share-server; yet, the description only provides mathematical formula with no explanation on implementation or system structure.

Yair Frankel et al in CertCo Company in New York has brought forward a scheme but without implementation diagram or any details of the system. In this scheme, it is proposed that polynomial coefficients $a_i$ is in $\{0, L, \ldots, 2L^3 N^{2+e} t\}$, wherein $L=k!$, and $x_i$ belongs to $[1, 2, \ldots, k-1]$. Since all $f(x_i)$ can be divided by L, so $b_i$ computation is without reverse operation and can be made in the integer domain. The scheme may apply the general RSA algorithm without the requirement of strong prime. Nevertheless, as parameter selection is greatly limited, so algorithm principle and proving of security becomes complicated. When a share-server computes $b_i$, the synchronization problem also exists for $b_i$ depends on the selection of $x_i$.

From the mathematical description, the scheme has the following disadvantages:

1. A secret-key is shared equally, that is, the share is a single layer structure.
2. Selection of parameters is limited and prove of security is complicated, so possibility of loophole occurring is increased.
3. The synchronization problem exists and if taking away synchronization, computation volume of the combiner will be greatly increased.

The schemes of IBM Research—Zurich Institute and CertCo Company are all based on the Shamir scheme of sharing secret-key using LaGrange interpolation equation. In the original Shamir secret sharing scheme, a secret-key can be generated by taking t shared secret-keys randomly. But in the original Shamir scheme, the secret-key has to be recovered first and this is unexpected for any scheme, for above all the signature security must assure that it is impossible to recover the secret-key in any device.

Basic principle of Shamir scheme of sharing secret-key is as follows:

Give a polynomial $$f(x) = \sum_{i=0}^{t-1} a_i x_i,$$

with Lagrange interpolation formula there is:

$$f(x) = \sum_{i=1}^{t} \left( f(x_i) \prod_{j=1,t}^{j \neq i} \frac{x - x_j}{x_i - x_j} \right) \quad (1)$$

Select t individual items of $x_i$ and $f(x_i)$, it can be obtained that:

$$a_0 = f(0) = \sum_{i=1}^{t} \left( f(x_i) \prod_{j=1,t}^{j \neq i} \frac{-x_j}{x_i - x_j} \right) \quad (2)$$

$a_0$ can be set as a secret-key, in this case the signature computation of a hash value M is:

$$M^d = M^{f(0)} = \prod_{i=1}^{t} M^{f(x_i) \prod_{j=1,t}^{j \neq i} \frac{-x_j}{x_i - x_j}} = \prod_{i=1}^{t} M^{b_i} \quad (3)$$

$$\text{wherein } b_i = f(x_i) * c_i = f(x_i) \prod_{j=1,t}^{j \neq i} \frac{-x_j}{x_i - x_j} \quad (4)$$

Therefore, secret-key d can be divided into k share-servers, with $k \geq t$. Each share-server computes $M^{b_i}$, then a combiner multiplies computation results of every share-server to obtain the $M^d$. In this case, any share-server does not leak the secret-key d. Since there are division operations in formula (4), it is easy to be considered to find a domain or ring $Z_v$ for the computation. Here, it must be satisfied that v is a prime number, or v and the determinant of t order Vandermonde array consisted of $x_i$ are relative primes.

In general situation, computing $M^{b_i}$ separately will bring a consequence that multiplication $$\prod_{i=1}^{t} M^{b_i} = M^{d+wv}$$

is needed. About how to take away the affection of v, many people thinks about the $\phi(N)$ for the reason that $M^{\phi(N)}=1$. When $v=\phi(N)$ is taken, selection of $x_i$ is greatly limited by the above condition. Furthermore, when an element $\circ$ and its $\phi(N)$ inverse $\circ^{-1}$ are known, the $\phi(N)$ can be obtained, so it is obviously unsafe.

Therefore, theoretically the above schemes have evident disadvantages and there are a lot of problems that need solving before the practical application.

SUMMARY OF THE INVENTION

An object of the invention is to provide a digital certificate issuing system with intrusion tolerance ability and issuing method thereof. The system and method are used for secure signature and limited to the condition that Certificate Authority (CA) is used. Based on the present CA security principle, the system and method can solve the pre-synchronization problem, and satisfy online CA security requirement. With this system and method, even if a part of key components in system are conspiracy attacked, it is assured that system secret will not be compromised, meanwhile, the system can provide continuous service even when some components are fault or took out.

In the digital certificate issuing method with intrusion tolerance ability according to the present invention, CA is based on RSA algorithm. The method at least should satisfy the following requirements:

1. Even when an attacker has attacked or occupied several components of a system, or when conspiracy attack is made by some key components of the system, the attacker cannot disclose the private key; and working tasks of all key components of the system are basically equilibrium.
2. The system is easy to extend and simple to manage. The management includes addition of secret share calculators or secret share combiners, deletion or update hardware or software etc., and system management or configuration do not affect normal operation of system.
3. When one or several devices are damaged, normal service will not be affected.
4. When a secret share calculator is damaged, efficiency of the system will not decrease too much, and the task distributor doesn't need any information about task executors.
5. At the beginning of a computation, any device doesn't need to know its cooperators, so it is unnecessary to have a mechanism to define a cooperation group (pre-synchronization).
6. Algorithm and principle of the system should be rather simple.
7. Efficiency of the system should be at the same level as the conventional system.

The embodiment of the present invention provides a digital certificate issuing system with intrusion tolerance ability, the system includes: an offline secret key distributor, at least one online task distributor, k online secret share calculators and m online secret share combiners;

the offline secret key distributor is configured for splitting a private key into multiple first sub-secret-keys $d_{ji}$ and multiple second sub-secret-keys, sending the first sub-secret-keys $d_{ji}$ to the k online secret share calculators; sending the second sub-secret-keys and equation combination representations corresponding to the second sub-secret-keys to the m online secret share combiners; and the private key is constructed by one second sub-secret-key and t first sub-secret-keys $d_{ji}$, each equation combination representation comprises t items of j and i, j is sequence number of the secret share calculator and i is number of the first sub-secret-key in the $j^{th}$ secret share calculator, and each of j in one equation combination representation is different;

the at least one online task distributor is configured for sending out a certificate to be signed through a first broadcast channel;

the k online secret share calculators are configured for checking correctness of the certificate to be signed, calculating at least t first calculation results according to first sub-secret-keys stored and the certificate to be signed, and sending out the at least t first calculation results, at least t items of j and i corresponding to the at least t first calculation results respectively through a second broadcast channel; and the m online secret share combiners are configured for matching t items of j and i received through the second broadcast channel with the equation combination representations stored, and determining a matched online secret combiner storing the matched equation combination representation including t items of j and i;

the matched online secret share combiner is configured for checking the correctness of the certificate to be signed, calculating a second calculation result according to the certificate to be signed and the second sub-secret-key corresponding to the matched equation combination representation, calculating a digital signature according to the t first calculation results corresponding to the t items of i and j in the matched equation combination representation and the second calculation result, generating a digital certificate according to the digital signature and contents of the certificate to be signed;

j, i, k, t and m are positive integers, and t is less than k.

The embodiment of the present invention also provides a method for a digital certificate issuing system with intrusion tolerance ability issuing digital certificate, the method includes:

splitting a private key into multiple first sub-secret-keys and multiple second sub-secret-keys, wherein the multiple first sub-secret-keys are divided into k groups, and the private key is constructed by one second sub-secret-key and t first sub-secret-keys, the second sub-secret-key corresponds to the t first sub-secret-keys according to an equation combination representation including t items of i and i, j is sequence number of the group which has the first sub-secret-key, and i is number of the first sub-secret-key in the $j^{th}$ group, each of j in one equation combination representation is different, j, i, k, and t are positive integers, and t is less than k;

calculating t first calculation results according to a certificate to be signed and the t first sub-secret-keys in the multiple first sub-secret-keys upon receiving the certificate to be signed;

obtaining the second sub-secret-key corresponding to the t first sub-secret-keys according to the equation combination representation;

calculating a second calculation result according to the second sub-secret-key obtained and the certificate to be signed;

generating a digital signature according to the t first calculation results and the second calculation result;

generating a digital certificate according to the digital signature and contents of the certificate to be signed.

The digital certificate issuing system with intrusion tolerance ability and issuing method thereof according to the invention is based on RSA algorithm. Through secret-key share with a two layer asymmetric structure, the system management and implementation difficulties mentioned in the background section are overcome, thus the object of the invention is achieved.

The method and system according to the invention have the following characteristics:

1. The online task distributor can broadcast a digital signature task without selecting secret share calculators and specifying sub-secret-keys, so when system is updating, the online task distributor will not be affected, and when a secret share calculator is damaged suddenly, execution time for broadcasting a task will not be affected too.

2. When adding a secret share calculator, it is necessary only to generate a set of first sub-secret-keys for the new secret share calculator. The offline secret-key distributor can make equation combination according to the number of the newly added secret share calculator and the numbers of existing secret share calculators, compute the corresponding second sub-secret-key $c_a$, and then add the new equation combination representation and $c_a$ to the secret share combiner in a way accepted by administration. The adding will not affect the system normal operation.

3. When taking away a secret share calculator, shutting down the device is enough; for efficiency reason, equation combination representation including the secret share calculator number and corresponding $c_a$ can be deleted.

4. The invention has the intrusion tolerance ability as other schemes mentioned in background section. When less than t secret share calculators are intruded, the system secret key d will not be leaked. Since secret share combiners are added, even all secret share calculators are intruded, the system secret key d will not be leaked also. It can be proved theoretically that attacking secret share combiners cannot obtain the system secret key d; although there are many equations, the rank of coefficient matrix of the equations is less than the number of variables.

5. The invention can resist a conspiracy attack from the secret share calculator and the secret share combiner, i.e. even when a conspiracy attack is done by a secret share calculator and a secret share combiners, the system secret key d will not be leaked, furthermore, comparing with other schemes, the number of the secret share combiners can be less greatly, for example, when k=5 and t=3, the least number of secret share combiners is 2.

6. An operator confirmation is added during distributing private key and issuing certificate, which will further guarantee security and reliability of issuing digital certificate. Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The foregoing and other advantages and features of the invention will become more apparent from the detailed description of the preferred embodiments of the invention given below with reference to the accompanying drawings in which.

DETAILED DESCRIPTION OF THE PREFERRED EMBODIMENTS

The following description of the preferred embodiment(s) is merely exemplary in nature and is in no way intended to limit the invention, its application, or uses.

Figure 2:
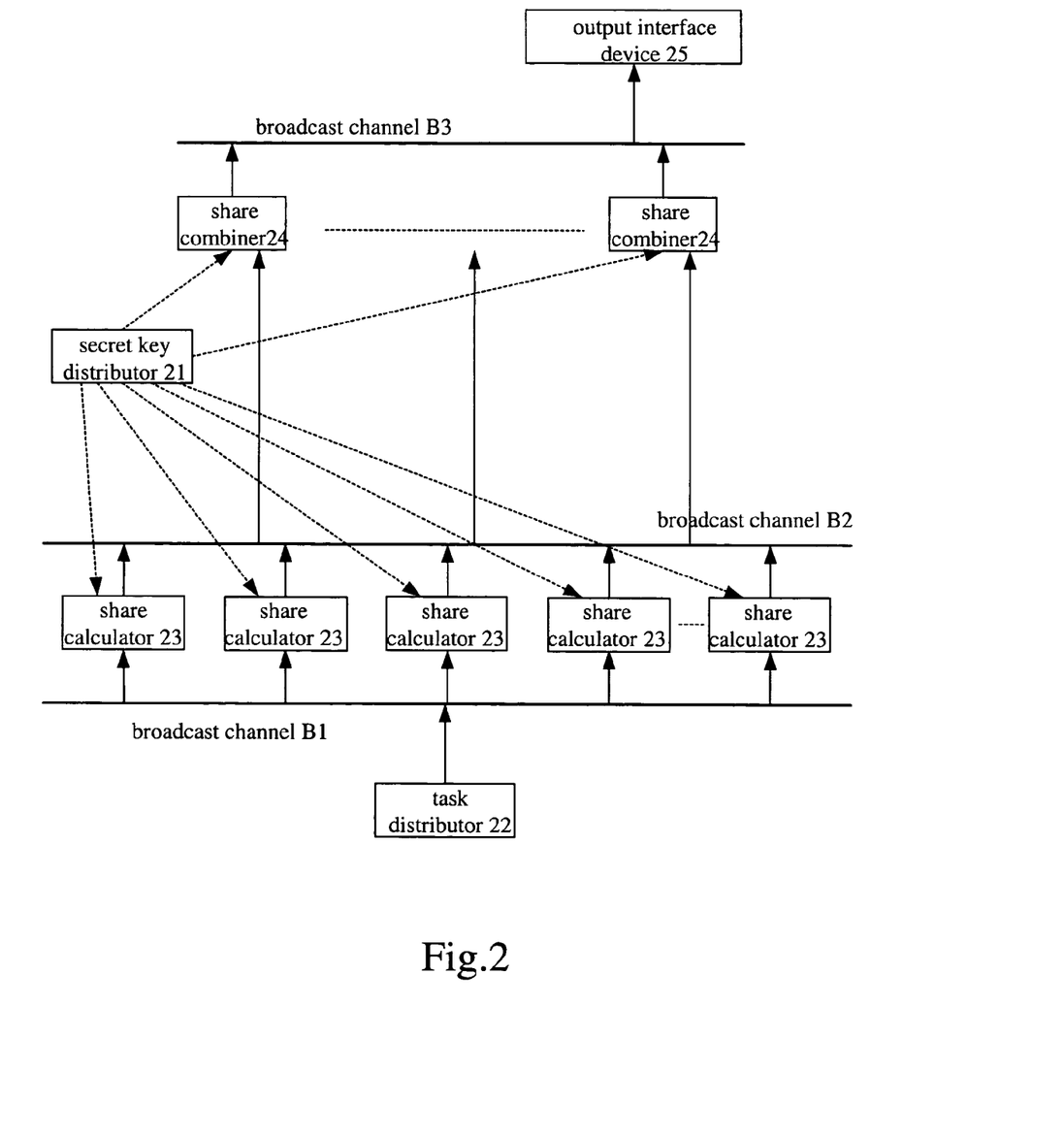
FIG. 2 is a schematic diagram illustrating a digital certificate issuing system with intrusion tolerance ability according to the invention.

FIG. 2 is a schematic diagram illustrating a digital certificate issuing system with intrusion tolerance ability. The issuing system applies RAS algorithm as its basic algorithm.

The issuing system comprises an offline secret key distributor 21, at least one online task distributor 22, k online secret share calculators 23, m online secret share combiners 24 and an independent online output interface device 25. All these devices can be different common computers or servers. The online task distributor 22 is connected to k online secret share calculators 23 through broadcast channel B1 such as UDP protocol channel. The k secret share calculators 23 are connected to m secret share combiners 24 through broadcast channel B2. The m secret share combiners 24 are connected to the output interface device 25 through broadcast channel B3. The offline secret key distributor 21 is respectively connected to k secret share calculators 23 and m secret share combiners 24 during system initialization or configuration processing (as shown with dot-lines in FIG. 2).

The offline secret key distributor 21 stores a secret key d and does not have network connection with any other systems. The broadcast channels B1, B2 and B3 can be connected physically as one channel or can be independent channels.

The basic principle for realizing the entire system structure is representing a big integer with the sum of several integers, that is, employing the expression: $d = d_{1i_1} + d_{2i_2} + d_{3i_3} + \ldots + d_{ti_t} + C_a$. Suppose $d_{ji}$ represents any item from $d_{1i_1}$ to $d_{ti_t}$ in the above expression, and the private key for digital signature during issuing digital certificate is d. In the expression, the number of $d_{ji}$ is t, meanwhile all of d, $d_{ji}$ and $c_a$ are positive integers, $d_{ji}$ is a random number to simplify administration. The difference between the above expression and the expression $d = d_1 + d_2 + d_3 + \ldots + d_t$ which is described in the background section is that $c_a$ (a=1, 2 . . . n) is added to form a new system structure which is secure and easy to administrate. Here, the number of bits in $d_{ji}$ is the half of N.

The processing of sharing secret d in this system structure is completed through two layers of components: one layer of components is composed of secret share calculators 23 and another layer of components are composed of secret share combiners 24. More than one $d_{ji}$ are respectively stored in the secret share calculators 23, and $c_a$ is stored in the secret share combiners 24. In this way, a two-layer secret share structure is formed. Two layers of components respectively store first sub-secret-key $d_{ji}$ and second sub-secret-key $c_a$. The first sub-secret-key $d_{ji}$ employs two digits as its suffix, among them the first digit j is a sequence number, i.e. device number, of the secret share calculators 23, j=1, 2 . . . k, and the second digit i is a number of the secret keys stored in a certain secret share calculator 23, i=1, 2 . . . I. For example, when a secret share calculator 23 stores two items of $d_{ji}$, the first sub-secret-key respectively are $d_{j1}$ and $d_{j2}$, meanwhile $d_{11}$ and $d_{12}$ represent two items of first sub-secret-keys stored in the first secret share calculator. The a is the second sub-secret-key number inside the machine of the secret share combiner.

In the two-layer share structure, the second layer secret share combiners start to work only after the first layer secret share calculators have completed calculation. Since the secret share combiners store the sub-secret-key $c_a$ also, they cannot be substituted by other devices.

First, the private key for signature of the Certificate Authority is distributed. The distribution operation for the first sub-secret-keys is implemented as follows.

The offline secret key distributor 21 generates I random numbers $d_{ji}$ for each secret share calculators 23. For a system having k secret share calculators 23, there are k×I first sub-secret-keys $d_{ji}$, j=1, 2, 3, 4 . . . k. Here, the number of bits in $d_{ji}$ is the half of N. For example, suppose I=2, the $d_{11}$ and $d_{12}$ are sent to the first secret share calculator 23 through a manner accepted by the key administration, the $d_{21}$ and $d_{22}$ are sent to the second secret share calculator 23, and so on, until the $d_{k1}$ and $d_{k2}$ are sent to the $k^{th}$ secret share calculator 23.

An appropriate parameter t, which means that the system security will not be affected if t−1 secret share calculators 23 are intruded, need to be determined in advance. In order to assure that the system can take t results from the k secret share calculators for complementing operation, t<k should be assured.

The distribution processing of the second sub-secret-keys is as follows. The offline secret key distributor 21 takes t items from the k×I first sub-secret-keys, and then the $c_a$ can be obtained through a subtraction based on the equation $d=d_{1i_1}+d_{2i_2}+d_{3i_3}+ \ldots +d_{ti_t}+C_a$. There are $C_k^t \times i^t$ possibilities in total for taking t items, so the ca values of the $C_k^t \times i^t$ equations can be obtained. Here, $n=C_k^t \times i^t$ represents combinations, and there are n $c_a$ values and n equation combination representations. Every equation combination representation represents a suffix combination (or referred to sequence number of the variable) of corresponding t first sub-secret-keys $d_{ji}$, the corresponding suffix of the secret key $d_{ji}$ in this equation is the secret key combinations. Obviously, different first sub-secret-keys in an equation combination are located in different secret share calculators, and an equation combination only relates with the suffixes of the first sub-secret-key $d_{ji}$, i.e. two digits of j and i, without leaking any information about the sub-secret-key. Suppose every equation combination comprises t items, and digits of each item are the suffixes j and i of a first sub-secret-key $d_{ji}$, for example, (12, 23, 31) represents an equation combination representation when t=3.

Before describing the computation procedure for the combinations according to the present invention, first, the combinations with the same device number of secret share calculator are defined as equivalent combinations, and all equivalent combinations are defined as a set of equivalent combinations. For example, (12, 33, 41) (11, 31, 42) (12, 33, 42) are three equivalent combinations. Since tolerance and anti-intrusion are for a machine, for a certain machine, taking which sub-secret-key has no significant affection for successive computation, and setting equivalent combinations is for redundancy. For example, a combination result can be obtained through taking any one of three equivalent combinations mentioned above when the three machines (secret share calculators) are normal. Of course, after one of the three equivalent combinations has been taken, other combinations become meaningless.

The offline secret key distributor 21 divides all the equation combination representations, the sets of equivalent combinations and corresponding $c_a$ values into groups employing a exhaustive search method according to security condition of the combiners, so that each group has a limited number of equation combination representations. Then m secret share combiners are set according to the number of groups (m), so as to store the equation combination representations of the groups and corresponding $c_a$ values.

Provided that only one combination is taken from one set of equivalent combinations as a representative and then combinations of all representatives are stored into secret share combiners, the correct signature results for each machine combinations can be thus obtained.

The manner of grouping is a key point of the invention. Seen from the secret share combiners 24, only $c_a$ is known and other variables are unknown. The above-mentioned security condition of the combiners is proposed according the expressions and the requirements for system security, in which $d_{ji}$ is a variable. The security condition is that the number of variables with different first suffix is greater than t for a new equation which is obtained by linear combination of the equations involved in a secret share combiner.

If the above-mentioned condition is satisfied, the conspiracy attack of the combiners and the share calculators to a system can be thus avoided.

Now processing steps of computing and distributing combination represents in the secret key distributor is described, taking t=3 and k=5 as an example.

In the first step, the problem that a secret share calculator has multiple first sub-secret-keys is neglected firstly, all ten kinds of machine combinations are obtained based on $C_k^t$:

(1, 2, 3); (1, 2, 4); (1, 2, 5); (1, 3, 4); (1, 3, 5); (1, 4, 5); (2, 3, 4); (2, 3, 5); (2, 4, 5); (3, 4, 5).

These ten kinds of machine combinations are the result of selecting arbitrarily three calculators from the five secret share calculators.

In the second step, the obtained ten results are extended, that is, equivalent combinations are obtained for each result, 10 equivalent combination sets are thus formed. When each secret share calculator has two in-machine secret key numbers, each result has $2^t-1$ equivalent combinations. All these equivalent combinations are obtained and put in one equivalent combination set, in this way, each equivalent combination set has $2^t$ equivalent combinations that can be sorted randomly. For example, the equivalent combinations of result (1, 2, 3) with a random sequence are as follow: (11,21,31) (12,21,31) (11,22,31) (12,22,31) (11,21,32) (12, 21,32) (11,22,32) (12,22,32).

In the third step, all the equivalent combination sets are put into a big group. Then they are sorted randomly and prepared to be divided into multiple subgroups.

In the fourth step, an equivalent combination set is taken from the big group sequentially, and then a combination is taken from the equivalent combination set sequentially. Grouping process is implemented through an exhaustive search method according to the security condition, that is, whether the combination can be put into the first subgroup is determined. If so, the combination is put into the first subgroup, and the equivalent combination set is discarded provided that one combination in the equivalent combination set has been put into one subgroup. If the combination cannot be put into the first subgroup, it is returned to the equivalent combination set; and the next equivalent combination of the same equivalent combination set is taken, whether the next combination can be put into the first subgroup is further determined according the security condition. If all equivalent combinations of the same equivalent combination set do not satisfy the security condition, that is, all of them cannot be put into the first subgroup, the same processing is implemented for the second subgroup. If the processing result is not satisfied, then the same processing is implemented for the third subgroup, and so on. After the procedure has been finished, combinations in each non-empty subgroup are taken out, and all combination represents in each subgroup are pre-stored into corresponding secret share combiners through a manner which is accepted by the administrator.

In the fifth step, the fourth step is repeated until all the equivalent combination sets in the big group have been taken into subgroups.

In the sixth step, statistics for the subgroups concluding combinations are taken, and the combinations of a certain subgroup are pre-stored into a secret share combiner.

In the seventh step, some of other combinations that satisfy the security condition are added into each subgroup with combinations in order to increase redundancy. However, in the adding process, when a combination in an equivalent combination set has been taken into a subgroup, the equivalent combination set will not be discarded.

Under the condition that there are 5 secret share calculators 23 and there are two in-machine secret keys of the first sub-secret-key in each calculator, the computation result after the above processing is as follows.

The five combinations in the first subgroup are:
(11, 22, 31)
(21, 32, 41)
(31, 42, 51)
(11, 41, 52)
(12, 21, 51)

The five combinations in the second subgroup are:
(11, 21, 42)
(22, 41, 51)
(21, 31, 52)
(11, 32, 51)
(12, 31, 41)

The five combinations in the third subgroup are:
(11, 32, 41)
(12, 21, 31)
(11, 22, 51)
(21, 41, 52)
(31, 42, 51)

It can be seen from the above result that only three secret share combiners 24 (or at least two) is enough for five secret share calculators. This is because there are only 10 equivalent combinations in real and now 15 equivalent combinations have been taken into the three secret share combiners, and many redundancies are thus added.

Although each secret share combiner 24 does not store all the combinations of all sub-secret-keys $d_{ji}$, all contents stored in all secret share combiners 24 can guarantee that all t combinations for the k secret share calculators are involved.

During computation of a digital signature for a certificate, secret share calculators 23 make ascending power computation for their first sub-secret-keys $d_{ji}$, the secret share combiners look for matching combinations and then compute them and combine them to a result.

During computation of a digital signature for a certificate, the task distributor sends a certificate to be signed and its hash value M to k secret share calculators 23 through broadcast channel B1 with broadcasting mode; when more than t normal secret share calculators, i.e. the secret share calculators that have not been attacked, have received the data, it is assured that the computation result can be obtained.

After having received a task, the secret share calculators compute the hash value of the certificate to be signed, and compare it with the pre-stored hash value M to determine whether they are matched. If they are not matched, the successive steps are stopped. If they are matched, the certificate to be signed is first checked by an operator of the secret share calculators through a machine interface. After a confirm button has been pressed by the operator, the secret share calculators make the ascending power computation for all of their first sub-secret-keys. For example, the $j^{th}$ secret share calculator computes the ascending power $M^{d_{ji}}$ after having received the data. This means that each secret share calculator computes the ascending power for all of its first sub-secret-keys. For example, for the first secret share calculator with two first sub-secret-keys, $M^{d_{11}}$ and $M^{d_{12}}$ are obtained first. Then, the $M^{d_{11}}$, $M^{d_{12}}$ and their individual sub-secret-key numbers 11 and 12 (ji), content of the certificate to be signed and its hash value M, task number, task distributor number, its machine number are packed and sent to secret share combiners 24 through broadcast channel B2 with broadcasting mode. The process of sending can be implemented just after finishing calculation of $M^{d_{ji}}$, or the result can be sent immediately after it is obtained to improve the efficiency.

After receiving the results, the secret share combiners 24 check them, and store the received packets according to the task. When the number of results received of a task is t, the received results are compared with the pre-stored equation combination representations with an exhaustive search method, and a matched combination representation will be found; from the matched combination representation, a corresponding sub-secret-key $c_a$ can be obtained. Then, the administrator of the secret share combiners through machine interface checks the content of the certificate to be signed. After the operator has pressed the confirm button, several matched ascending power results are multiplied, a result R is thus obtained. $M^{c_a}$ can be obtained based on the found $c_a$. Finally, the digital signature of the certificate $S=M^d$ will be obtained through multiplying $M^{c_a}$ and R.

According to the ITU X.509 standard, the secret share combiners 24 encode the digital signature and the content of the certificate to be signed to generate a X.509 certificate.

The secret share combiners 24 send the signature S to the output interface device 25 in which the correctness of the signature is checked based on the public key.

In the computation procedure above, all broadcasting packets should further comprise: a task distributor number, a number of task that is allocated by the task distributor etc. in order that the system can recognize different tasks and support multi-tasks operation in parallel.

Figure 3:
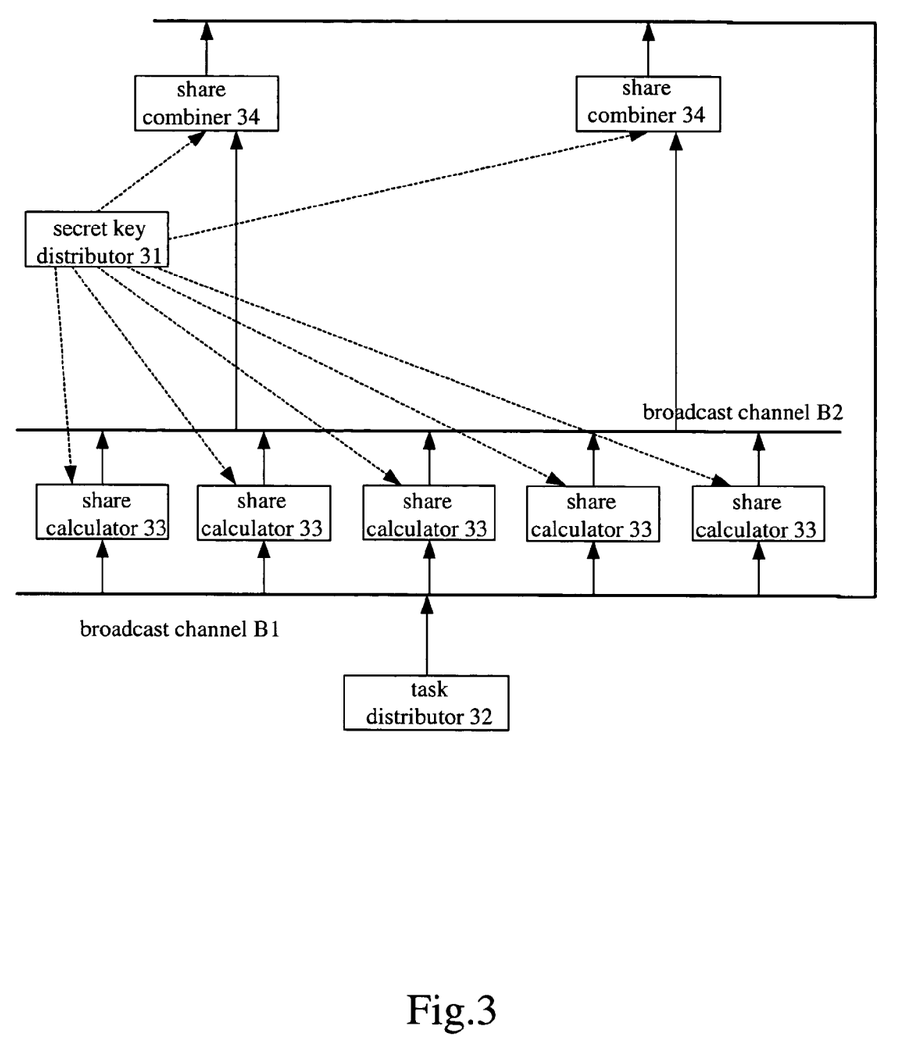
FIG. 3 is a schematic diagram illustrating another digital certificate issuing system with intrusion tolerance ability according to this invention.

FIG. 3 is a schematic diagram illustrating another embodiment of digital certificate issuing system with intrusion tolerance ability according to the invention. The system comprises an offline secret key distributor 31, five secret share calculators 33 (k=5), two secret share combiners 34 and an online task distributor 32 that is used as output interface device too. The online task distributor 32 is connected to the five secret share calculators 33 through broadcast channel B1. The five secret share calculators 33 are connected to the two secret share combiners 34 through broadcast channel B2, and also connected to the online task distributor 32 through broadcast channel B1. The offline secret key distributor 31 is connected to the five secret share calculators 33 and two secret share combiners 34 during system initialization and configuration processing.

First, the distributing operation for a private key for signature of certificate authority will be described.

An arbitrary number such as 22 is given to the online task distributor 32; a number such as 1, 2, 3, 4 or 5 is given to each of the secret share calculators 33; a number such as 1 or 2 is given to each of the two secret share combiners 34. The system initial value t is set at 3. The private key d is managed by the offline secret key distributor 31.

The offline secret key distributor 31 arbitrarily selects 10 random numbers $d_{11}, d_{12}, d_{21}, d_{22}, d_{31}, d_{32}, d_{41}, d_{42}, d_{51}, d_{52}$ whose lengths are equal to or greater than ½ length of N. Through a mode that is accepted by administration, $d_{11}$ and $d_{12}$ are sent to the first secret share calculator, $d_{21}$ and $d_{22}$ are sent to the second secret share calculator, $d_{31}$ and $d_{32}$ are sent to the third secret share calculator, $d_{41}$ and $d_{42}$ are sent to the forth secret share calculator and $d_{51}$ and $d_{52}$ are sent to the fifth secret share calculator.

The $c_a$ is obtained by making a subtraction from formula $d = d_{1i_1} + d_{2i_2} + d_{3i_3} + \ldots + d_{ti_t} + C_a$. By extending the $C_k^t$ results, the $C_k^t$ equivalent combination sets are obtained and put into a big group.

According the security condition, the combination representations of two subgroups and their $c_a$ values are obtained through an exhaustive search method.

The offline secret key distributor 31 sends the $c_a$ values of the two subgroups and their equation combination representations to two secret share combiners 34 with the mode that is accepted by the administration.

After the sub-secret-keys have been sent, the offline secret key distributor 31 can be shut down.

The computation procedure of a digital signature for a certificate is as follows:

After having received a signature task for a certificate and having made the corresponding security check, the online task distributor 32 computes hash value M of the certificate to be signed.

The online task distributor 32 defines a task number for the current signature task; the task number should be unique for this task distributor during a period of time (such as two days).

The task distributor number (22), the task number of this task, the certificate to be signed and its hash value M are packed to a packet and broadcasted to the broadcast channel B1.

After secret share calculator j (at least three secret share calculators among all secret share calculators 33 if t=3) has received the broadcasting packet, it sends an acknowledgement to the task distributor 32 saying that the broadcasting packet has been successfully received.

Then, the secret share calculator j checks the uniqueness of the task. When it is a new task, hash value of the certificate to be signed is computed and compared with the pre-stored hash value M. If they are matched, the successive operations can be continued, otherwise the operation is ended. And then, content of the certificate to be signed are shown on the screen of the machine, an operator determines whether or not the processing will be continued. After the operator has confirmed the operation, ascending power computation $M^{d_{ji}}$ is made.

The secret share calculator j broadcasts a packet which comprises the number j of itself, the task distributor number 22, the task number, the certificate to be signed and its hash value M, and computation result $M^{d_{ji}}$ to the broadcast channel B2.

The secret share combiners 34 receive the broadcasting packet and put the information with the same task distributor number and the same task number into the same group.

The secret share combiners 34 check whether there are three or more than three results in one group and whether there are three results which can be matched with the stored equation combination representations. If so, corresponding $c_a$ is obtained from the matched equation combination representations. Then, content of the certificate to be signed are displayed on the machine interface of the secret share combiners. After the operator of the secret share combiners has agreed the processing, the processing will be continued; otherwise the task will be set as illegal task and kept at the system for a period of time. In the next processing, $M^{c_a}$ is obtained based on $c_a$, then R is computed through multiplying the three results that are matched with the combination representations, finally, the digital signature for a certificate $S = M^d$ is obtained through multiplying $M^{c_a}$ and R.

The certificate is generated based on the digital signature $S = M^d$ and the content of the certificate to be signed.

The secret share combiners 34 send the task distributor number, the task number and the certificate with digital signature $S = M^d$ to the broadcast channel B1.

The task distributor 32 checks whether or not the certificate is correct with the public key after receiving the digital certificate. If the certificate is incorrect, the error processing or warning will be implemented, and if the certificate is correct, then the task of issuing certificate is completed.

All of the specific steps according to the embodiment are suitable to the embodiment shown in FIG. 2 also.

The method according to the invention can effectively resist a conspiracy attack from the secret share combiners and the secret share calculators. In the above embodiment, any secret share combiner needs to unite with at least three secret share calculators for obtaining the secret key d, so the method can powerfully resist a conspiracy attack. And only two secret share combiners are needed in the invention.

The secret share calculators and secret share combiners according to the embodiments shown in FIG. 2 and FIG. 3 can employ multithreading technology, i.e. one kind of multitasking parallel processing technique used in a computer operation system. For example, three threads: a task processing program, a monitoring program and an interface program can be used for secret share calculators or secret share combiners. All of the computation tasks are managed by a task queue, and the three threads can access all system parameters (including sub-secret-keys).

The task processing program is specialized for computation. Since computation needs a great amount of time, a single thread is created to implement computation, in order that interaction with users and monitoring data on the network can be continued during computation. The task processing thread uses event synchronization mechanism for waiting, so the CPU time can be saved when there are no computation tasks, and the synchronization can be achieved through employing system events such as EVENT in NT. When the task processing thread is waked up, it scans the task queue to look for the task that should be processed, such as sending data packets that should be re-sent.

The monitoring program is set to guarantee that data on network will not be lost; it monitors broadcasting data on the network. The monitoring thread only makes simple task processing, such as deleting a task or adding a task; and when a new task is coming it wakes up the task processing thread.

The interface program that employs a single thread also is used to process user interface, such as update system parameters and add sub-secret-key etc. without affecting system operation.

The system according to the invention has simple structure, and is easy to implement, moreover, it has the ability of intrusion tolerance. Although total workload for a signature is increased comparing with a common signature processing, the system security is definitely guaranteed, and the system can resist the conspiracy attack from secret share calculators and secret share combiners.

In modern society, enterprises can use the public digital signature facilities. With the method and system according to the invention, a multi-enterprise scheme for public digital signature can be considered. In this scheme, every device stores a set of corresponding data for each enterprise, the task distributor puts the enterprise code into the broadcasting packet to distinguish the enterprises, the secret share calculators find corresponding secret key and implement computation based on the enterprise code, and the computation result is sent to the secret share calculators with the enterprises code etc.

After adding an enterprise code management, the system can become an agent of multiple users and enterprises, and the user or enterprise can control the secret key distributor and task distributor.

With this structure, multiple secret-key issuing centers, multiple task distributors, multiple secret key share calculators and multiple combiners are formed. Consequently, it is a perfect security signature service system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A digital certificate issuing system with intrusion tolerance ability, comprising an offline secret key distributor, at least one online task distributor, k online secret share calculators and m online secret share combiners, wherein
the offline secret key distributor is configured for splitting a private key into multiple first sub-secret-keys $d_{ji}$ and multiple second sub-secret-keys, sending the first sub-secret-keys $d_{ji}$ to the k online secret share calculators; sending the second sub-secret-keys and equation combination representations corresponding to the second sub-secret-keys to the m online secret share combiners; and the private key is constructed by one second sub-secret-key and t first sub-secret-keys $d_{ji}$, each equation combination representation comprises t items of j and i, j is sequence number of the secret share calculator and i is number of the first sub-secret-key in the $j^{th}$ secret share calculator, and each of j in one equation combination representation is different;
the at least one online task distributor is configured for sending out a certificate to be signed through a first broadcast channel;
the k online secret share calculators are configured for checking correctness of the certificate to be signed, calculating at least t first calculation results according to first sub-secret-keys stored and the certificate to be signed, and sending out the at least t first calculation results, at least t items of j and i corresponding to the at least t first calculation results respectively through a second broadcast channel; and
the m online secret share combiners are configured for matching t items of j and i received through the second broadcast channel with the equation combination representations stored, and determining a matched online secret combiner storing the matched equation combination representation including t items of j and i;
the matched online secret share combiner is configured for checking the correctness of the certificate to be signed, calculating a second calculation result according to the certificate to be signed and the second sub-secret-key corresponding to the matched equation combination representation, calculating a digital signature according to the t first calculation results corresponding to the t items of i and j in the matched equation combination representation and the second calculation result, generating a digital certificate according to the digital signature and contents of the certificate to be signed;

j, i, k, t and m are positive integers, and t is less than k.

2. The system of claim 1, wherein the offline secret key distributor is configured for generating k×I different random numbers as the first sub-secret-keys, and send each online secret share calculator I first sub-secret-keys, I is a positive integer which is more than or equal to i.

3. The system of claim 1, wherein the private key is a private key of Ron Rivest, Adi Shamir and Len Adleman (RSA) algorithm, and the private key is equal to the sum of one second sub-secret-key and the t first sub-secret-keys corresponding to the second sub-secret-key.

4. The system of claim 1, wherein the online secret share calculator is configured for calculating a HASH value M of the certificate to be signed, and make modular exponentiation $M^{d_{ji}}$ according to the M and the first sub-secret-key $d_{ji}$ stored to obtain the first calculation result.

5. The system of claim 1, wherein the online secret share combiner is configured for making modular exponentiation $M^{C_a}$ to obtain the second calculation result according to a HASH value M of the certificate to be signed and the second sub-secret-key corresponding to the matched equation combination representation, obtaining the digital signature via modular multiplication of t first calculation results corresponding to the t items of i and j in the matched equation combination representation, with the second calculation result, and $c_a$ is the second sub-secret-key.

6. The system of claim 1, further comprising:
an output interface device connected to the m secret share combiners via a third broadcast channel, configured for outputting the digital certificate.

7. The system of claim 1, wherein the online task distributor further comprises an output interface device connected to the m secret share combiners through the first broadcast channel, and the output interface device is configured for outputting the digital certificate.

8. The system of claim 1, wherein the offline secret key distributor is configured for keeping in a physical isolation state or a shut down state after the offline secret key distributor sends out the first sub-secret-keys and the second sub-secret-keys.

9. The system of claim 1, wherein the first broadcast channel and the second broadcast channel are the same channels physically.

10. The system of claim 6, wherein the first broadcast channel, the second broadcast channel and the third broadcast channel are the same channels physically.

11. The system of claim 2, wherein the offline secret key distributor is configured for obtaining online secret share calculator combinations according to a combination formula $C_k^t$, extending each online secret share calculator combination to obtain an equivalent combination set including $I^t$ equation combination representations, sending out the equation combination representations to the m online secret share combiners in each of which the equation combination representations comes from different equivalent combination sets, calculating the second sub-secret-keys according to the private key and the t first sub-secret-keys $d_{ji}$ corresponding to equation combination representation, and storing the second sub-secret-keys in the online secret share combiner.

12. The system of claim 11, wherein each of the online secret share calculator combinations obtained according to the combination formula $C_k^t$ comprises t sequence numbers of the secret share calculators; and each equation combination representation comprises t items of j and i, and each item corresponds to a first sub-secret-keys $d_{ji}$ which is the $i^{th}$ first sub-secret-key in the $j^{th}$ secret share calculator.

13. The system of claim 11, wherein the offline secret key distributor is configured for searching each equivalent combination set according to a security requirement of the online secret share combiner, obtaining one equation combination representation from each equivalent combination set, calculating the second sub-secret-key corresponding to the equation combination representation obtained, and sending the second sub-secret-key obtained and the equation combination representation obtained to the online secret share combiner.

14. The system of claim 1, wherein the offline secret key distributor is configured for sending the second sub-secret-keys and the equation combination representations corresponding to the second sub-secret-keys to m online secret share combiners through a mode permitted by administration policies.

15. The system of claim 1, wherein the system is configured for assigning a unique number for each online task distributor, and initiating a value of t.

16. The system of claim 15, wherein the online task distributor is configured for receiving a digital signature task, performing an examination and check, assigning a task number for the digital signature task which is unique for the online task distributor in a preset duration, broadcasting the online task distributor number, the task number, the certificate to be signed and a HASH value M of the certificate to be signed to the first broadcast channel through broadcasting data packets; and the k online secret share calculators are configured for broadcasting the online task distributor number, the task number, the certificate to be signed, a HASH value M of the certificate to be signed, the at least t first calculation results, and the at least t items of j and i corresponding to the at least t first calculation results respectively to the second broadcast channel through broadcasting data packets.

17. The system of claim 16, wherein the online secret share combiner is configured for putting the broadcasting data packets with the same task distributor number and the same task number into a group, finding out at least t broadcasting data packets, matching at least t broadcasting data packets with equation combination representations to obtain a matched equation combination representation, obtaining the second sub-secret-keys corresponding to the matched equation combination representation, calculating the HASH value M of the certificate to be signed, displaying the certificate to be signed and obtaining the digital signature if the HASH value M calculated is equal with the HASH value M stored.

18. The system of claim 16, further comprising:
an online output interface device, configured for receiving the digital certificate and the broadcasting data packets from the online secret share combiner, verifying the digital certificate with a public key; implementing a warning process or an error handling process if the digital certificate is incorrect.

19. A method for issuing digital certificate, comprising:
splitting a private key into multiple first sub-secret-keys and multiple second sub-secret-keys, wherein the multiple first sub-secret-keys are divided into k groups, and the private key is constructed by one second sub-secret-key and t first sub-secret-keys, the second sub-secret-key corresponds to the t first sub-secret-keys according to an equation combination representation including t items of j and i, j is sequence number of the group which has the first sub-secret-key, and i is number of the first sub-secret-key in the $j^{th}$ group, each of j in one equation combination representation is different, j, i, k, and t are positive integers, and t is less than k;

calculating t first calculation results according to a certificate to be signed and the t first sub-secret-keys in the multiple first sub-secret-keys upon receiving the certificate to be signed;

obtaining the second sub-secret-key corresponding to the t first sub-secret-keys according to the equation combination representation;

calculating a second calculation result according to the second sub-secret-key obtained and the certificate to be signed;

generating a digital signature according to the t first calculation results and the second calculation result;

generating a digital certificate according to the digital signature and contents of the certificate to be signed.

20. The method of claim 19, wherein the multiple first sub-secret-keys comprises multiple different random numbers.

21. The method of claim 19, wherein the private key is a private key of Ron Rivest, Adi Shamir and Len Adleman (RSA) algorithm, and the private key is equal to sum of t first sub-secret-keys and one second sub-secret-key.

22. The method of claim 19, wherein calculating t first calculation results comprises:
calculating a HASH value M of the certificate to be signed, generating the t first calculation results by calculating a modular exponentiation of the HASH value M and the t first sub-secret-keys respectively;

calculating a second calculation result comprises:
generating the second calculation result by calculating a module modular exponentiation of the HASH value M and the second sub-secret-key obtained according to equation combination representation; and generating a digital signature comprises:
generating the digital signature by calculating modular multiplication of the t first calculation results with the second calculation result.

* * * * *